United States Patent
Kawashima et al.

(10) Patent No.: US 9,482,043 B2
(45) Date of Patent: Nov. 1, 2016

(54) HINGED DOOR

(71) Applicant: KAWASAKI JUKOGYO KABUSHIKI KAISHA, Kobe-shi, Hyogo (JP)

(72) Inventors: Takahiro Kawashima, Kobe (JP); Tsunetoshi Goto, Kobe (JP); Hiroyuki Hirata, Kobe (JP)

(73) Assignee: KAWASAKI JUKOGYO KABUSHIKI KAISHA, Kobe-Shi (JP)

(*) Notice: Subject to any disclaimer, the term of this patent is extended or adjusted under 35 U.S.C. 154(b) by 0 days.

(21) Appl. No.: 14/772,799

(22) PCT Filed: Feb. 20, 2014

(86) PCT No.: PCT/JP2014/000882
§ 371 (c)(1),
(2) Date: Sep. 4, 2015

(87) PCT Pub. No.: WO2014/136390
PCT Pub. Date: Sep. 12, 2014

(65) Prior Publication Data
US 2016/0010385 A1 Jan. 14, 2016

(30) Foreign Application Priority Data

Mar. 7, 2013 (JP) ................................. 2013-045691

(51) Int. Cl.
*E06B 1/52* (2006.01)
*E06B 7/28* (2006.01)
(Continued)

(52) U.S. Cl.
CPC .............. *E06B 1/528* (2013.01); *B61D 19/004* (2013.01); *E06B 3/34* (2013.01); *E06B 5/00* (2013.01);
(Continued)

(58) Field of Classification Search
CPC ............ E06B 1/528; E06B 3/34; E06B 5/00; E06B 7/28; E06B 2003/7059; B61D 19/008; B61D 19/004; H02G 3/22; H02G 11/00; E05Y 2800/10; E05D 11/00
See application file for complete search history.

(56) References Cited

U.S. PATENT DOCUMENTS 3,848,361 A * 11/1974 Foster ................. E05D 11/0081
16/223
3,964,207 A * 6/1976 Peterson ................. E05D 7/081
16/275
(Continued)

FOREIGN PATENT DOCUMENTS

JP H04-52360 Y2 12/1992

OTHER PUBLICATIONS

Apr. 15, 2015 Written Opinion Issued in International Patent Application No. PCT/JP2014/000882.
(Continued)

*Primary Examiner* — Justin Rephann
(74) *Attorney, Agent, or Firm* — Oliff PLC

(57) ABSTRACT

A door main body includes a through hole formed on an end surface located at an end of the door main body in a rotation axis direction of rotation of the door main body, a cable or a hose being inserted through the through hole. A door frame portion includes: a frame opening portion which is formed on a surface opposed to the through hole and has a shape corresponding to a movement trajectory of the through hole when the door main body is opened or closed; and a slide supporting member supporting the cable or the hose extending through the frame opening portion while sliding relative to the frame opening portion.

5 Claims, 4 Drawing Sheets

(51) Int. Cl.
   *H02G 11/00* (2006.01)
   *B61D 19/00* (2006.01)
   *E06B 3/34* (2006.01)
   *E06B 5/00* (2006.01)
   *H02G 3/22* (2006.01)
   *E05D 11/00* (2006.01)
   *E06B 3/70* (2006.01)
   *E06B 3/58* (2006.01)

(52) U.S. Cl.
   CPC .............. *E06B 7/28* (2013.01); *H02G 11/00* (2013.01); *E05D 11/00* (2013.01); *E05Y 2800/10* (2013.01); *E06B 3/5892* (2013.01); *E06B 2003/7059* (2013.01); *H02G 3/22* (2013.01)

(56) References Cited

U.S. PATENT DOCUMENTS

| | | | | |
|---|---|---|---|---|
| 3,986,742 A * | 10/1976 | Heaney | ................... | E05C 17/28 16/49 |
| 4,445,299 A * | 5/1984 | Lehikoinen | ............. | D06F 39/14 174/86 |
| 4,609,234 A * | 9/1986 | Naniwa | ................... | E05D 3/022 16/341 |
| 5,690,501 A * | 11/1997 | Mader | ................. | E05D 11/0081 16/223 |
| 6,350,956 B1 * | 2/2002 | Sakata | ................ | B60R 16/0215 16/221 |
| 6,572,177 B2 * | 6/2003 | Griffis | .................... | H02G 11/00 296/146.4 |
| 6,812,407 B1 * | 11/2004 | Opperman | .......... | E05D 11/0081 16/2.2 |
| 2002/0009903 A1 * | 1/2002 | Malnati | .............. | H01R 13/6633 439/38 |
| 2004/0206106 A1 * | 10/2004 | Lee | ........................ | F25D 23/126 62/389 |
| 2005/0217308 A1 * | 10/2005 | Hwang | ............... | E05D 11/0081 62/440 |
| 2007/0204647 A1 * | 9/2007 | Puthiyaveetil | ........ | F25D 23/126 62/389 |
| 2007/0204648 A1 * | 9/2007 | Smale | .................. | F25D 23/126 62/389 |
| 2011/0056136 A1 * | 3/2011 | Rodgers | ..................... | E06B 7/28 49/70 |
| 2011/0296761 A1 * | 12/2011 | Wood | ........................ | E05D 5/04 49/70 |
| 2013/0186000 A1 * | 7/2013 | Gilchrist | .................... | E06B 7/28 49/13 |

OTHER PUBLICATIONS

Partial Translation of Japanese Patent Publication JP-Y2-H04-52360.
Apr. 15, 2014 International Search Report issued in International Patent Application No. PCT/JP2014/000882.

* cited by examiner

HINGED DOOR

TECHNICAL FIELD

The present invention relates to a hinged door including a cable or hose extending between a door main body and a door frame portion.

BACKGROUND ART

For example, in the case of manipulating an electrical apparatus attached to a hinged door, a power supply cable may be provided to extend between a door main body and a door frame portion. A metal fitting is commercially available, which allows the cable to extend between surfaces of the door main body and the door frame portion on which hinges are attached. However, in a case where such a metal fitting is used, a certain length or more of the cable between the door main body and the door frame portion needs to be secured. In this case, when the door main body is opened, the cable exposed from between the door main body and the door frame portion becomes large in length. When the cable exposed from between the door main body and the door frame portion is large in length, there is a problem that, for example, the cable tends to be damaged by a human act.

According to PTL 1, for the purpose of providing an electric wire (10) between a door (3) and a door frame (4) and protecting the electric wire, proposed is a power supply metal fitting including a connecting body (1) having one end which slides on an upper end edge of the door and the other end fixed to the door frame, the electric wire being inserted through the connecting body (1). According to this configuration, since the electric wire comes out from the upper end edge of the door, the electric wire is exposed little.

CITATION LIST

Patent Literature

PTL 1: Japanese Examined Utility Model Application Publication No. 4-52360

SUMMARY OF INVENTION

Technical Problem

However, in a case where the power supply metal fitting of PTL 1 is used for the hinged door, a large space for providing an intermediate member (connecting body) connecting the door main body (door) and the door frame is necessary between the upper end edge of the door main body and the door frame. Therefore, in a case where such a space cannot be secured due to structural limitations of the door frame portion and the periphery of the door frame portion, the intermediate member cannot be provided. The same problem occurs when providing a hose for compressed air or operating oil between the door main body and the door frame.

The present invention was made under these circumstances, and an object of the present invention is to provide a hinged door configured such that: a cable or hose is provided between a door frame portion and a door main body; an intermediate member provided between the door main body and the door frame portion is not required; and the cable or hose exposed from between the door main body and the door frame portion is small in length.

Solution to Problem

A hinged door according to an aspect of the present invention includes: a door frame portion; a door main body arranged inside the door frame portion; and an attaching member by which the door main body is rotatably attached to the door frame portion, wherein: a cable or a hose extends between the door frame portion and the door main body; the door main body includes a through hole formed on an end surface located at an end of the door main body in a rotation axis direction of rotation of the door main body, the cable or the hose being inserted through the through hole; and the door frame portion includes a frame opening portion which is formed on a surface opposed to the through hole and has a shape corresponding to a movement trajectory of the through hole when the door main body is opened or closed and a slide supporting member supporting the cable or the hose extending through the frame opening portion while sliding relative to the frame opening portion.

The present invention can provide the hinged door configured such that: the cable or hose extends between the door frame portion and the door main body; an intermediate member provided between the door main body and the door frame portion is not required; and the cable or hose exposed from between the door main body and the door frame portion is small in length.

Advantageous Effects of Invention

As above, the present invention can provide the hinged door configured such that: the cable or hose extends between the door frame portion and the door main body; an intermediate member provided between the door main body and the door frame portion is not required; and the cable or hose exposed from between the door main body and the door frame portion is small in length.

Description of Embodiments

Hereinafter, embodiments will be explained in reference to the drawings. In the following explanations and drawings, the same reference signs are used for the same or corresponding components, and a repetition of the same explanation is avoided.

Embodiment 1

Figure 1:
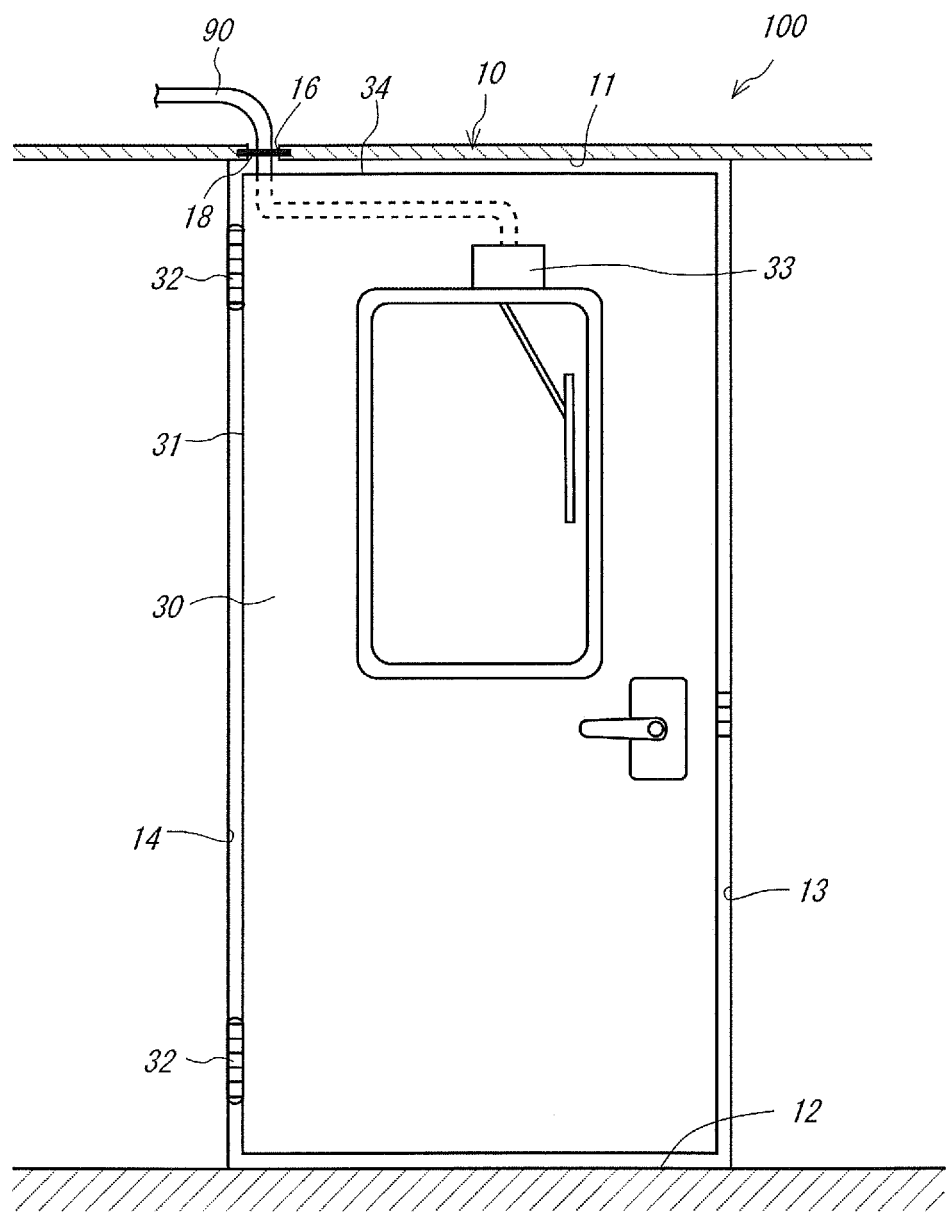
FIG. 1 is a front view of a hinged door according to Embodiment 1.
Figure 2:
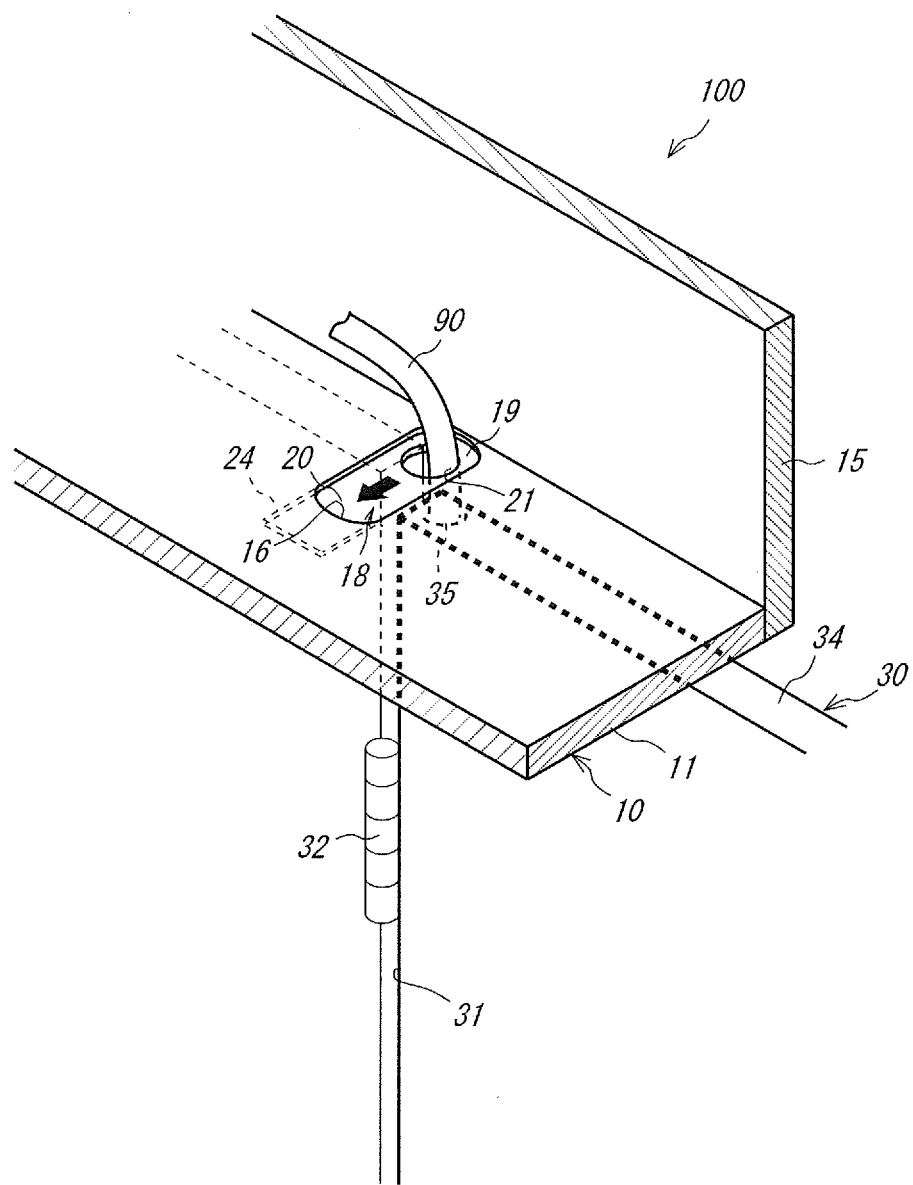
FIG. 2 is an enlarged perspective view of an upper left portion of the hinged door shown in FIG. 1 and is a diagram showing a state where a door main body is closed.
Figure 3:
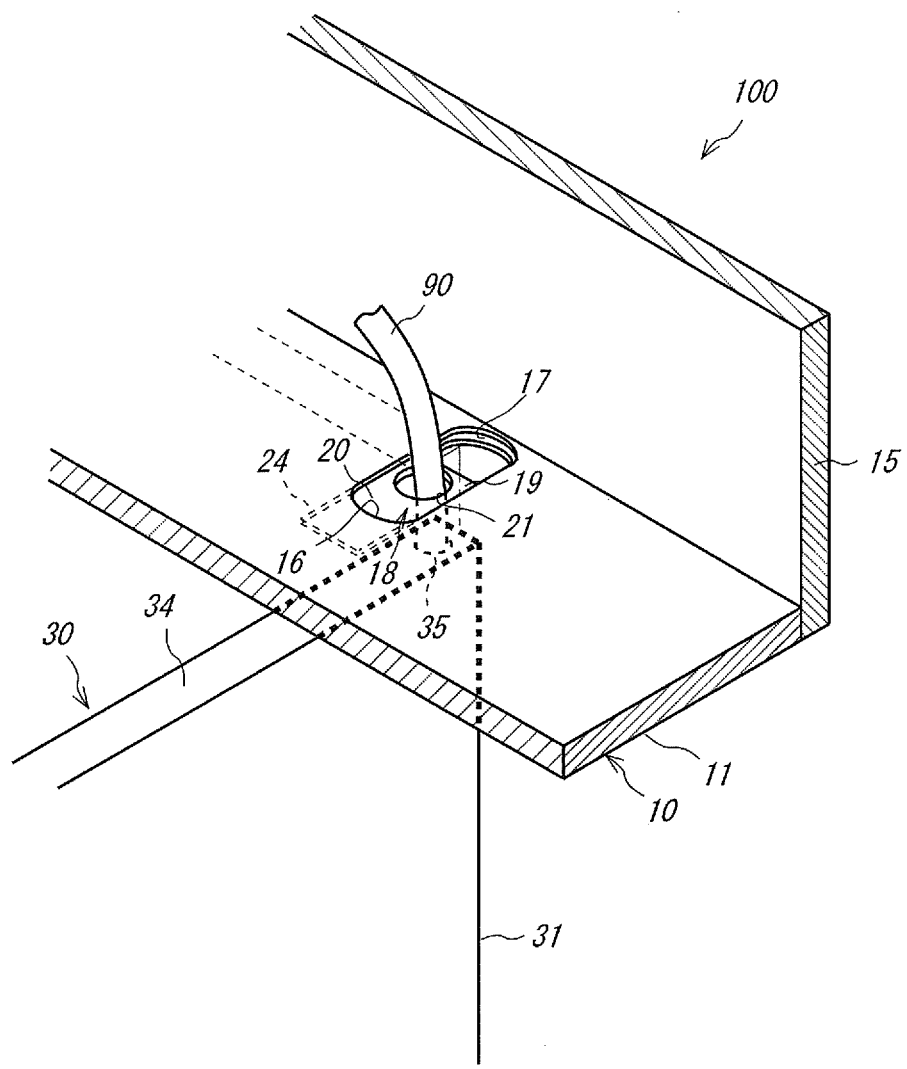
FIG. 3 is an enlarged perspective view of the upper left portion of the hinged door shown in FIG. 1 and is a diagram showing a state where the door main body is opened.

The following will explain a hinged door 100 according to Embodiment 1 in reference to FIGS. 1 to 3. First, a schematic configuration of the hinged door 100 will be explained in reference to FIG. 1. FIG. 1 is a front view of the hinged door 100. The following explanation will be made on the basis that upper, lower, left, and right sides on the sheet of FIG. 1 respectively correspond to upper, lower, left, and right sides of the hinged door 100. In the present embodiment, the hinged door 100 is provided at a longitudinal-direction end surface (end panel) of a railcar. A near side of the sheet of FIG. 1 is a car inner side, and a far side of the sheet of FIG. 1 is a car outer side. The hinged door 100 includes a door frame portion 10 and a door main body 30. A cable 90 is provided between the door frame portion 10 and the door main body 30 so as to extend between the door frame portion 10 and the door main body 30.

The door frame portion 10 is a portion located at an outer periphery of the door main body 30. The door frame portion 10 includes an upper door frame portion 11, a lower door frame portion 12, a right door frame portion 13, and a left door frame portion 14. These door frames are respectively formed by a ceiling plate inside a car, a floor panel inside the car, a right wall of the end surface of the car, and a left wall of the end surface of the car. In the present embodiment, the door frame portion 10 is formed by members which define the car inner side. However, the door frame portion 10 may be a so-called "door frame" integrally formed in a square frame shape. The cable 90 penetrates the door frame portion 10 (upper door frame portion 11) and extends from the door main body 30 to a ceiling space inside the car.

The door main body 30 is a member rotatably attached to the door frame portion 10. Hinges 32 are attached between the left door frame portion 14 and a left end surface 31 of the door main body 30, and the door main body 30 rotates about the hinges 32. To be specific, the hinges 32 are attaching members by which the door main body 30 is rotatably attached to the door frame portion 10. In the present embodiment, a rotation axis direction of the door main body 30 corresponds to an upper-lower direction. The door main body 30 is a single door. The door main body 30 rotates by 90° at most from a closed state to open toward the car inner side but does not open toward the car outer side. The door main body 30 is provided with a wiper. One end of the cable 90 is connected to a wiper driving device 33 that is an electric device which drives the wiper. A space is formed inside the door main body 30. The cable 90 extends through this internal space of the door main body 30 to come out from an upper end surface 34 of the door main body 30. The door main body 30 is normally closed. However, in a state where the cars are coupled to each other, the door main body 30 is kept open.

Next, a detailed configuration and operations of the hinged door 100 will be explained in reference to FIGS. 2 and 3. Each of FIGS. 2 and 3 is an enlarged perspective view of an upper left portion of the hinged door 100. FIG. 2 is a diagram showing a state where the door main body 30 is closed. FIG. 3 is a diagram showing a state where the door main body 30 is opened (a rotation angle of the door main body 30 is 90°). A lower left side of the sheet of each of FIGS. 2 and 3 is the car inner side, and an upper right side thereof is the car outer side. In FIGS. 2 and 3, a plate-shaped member 15 perpendicular to the ceiling plate (upper door frame portion 11) inside the car defines the ceiling space. In the present embodiment, the member 15 constitutes a part of the longitudinal-direction end surface of the car. Therefore, the member 15 is very difficult to machine because of its structure. Further, various devices are arranged in the ceiling space.

As shown in FIG. 2, a through hole 35 through which the cable 90 is inserted is formed at the hinge 32 side of the upper end surface 34 of the door main body 30, that is, at a hanging side. The through hole 35 is provided on an end surface (upper end surface 34) of the door main body 30 which is located at an end of the door main body 30 in the rotation axis direction of the hinges 32 and is not an end surface (left end surface 31) of the door main body 30 on which the hinges 32 are provided. The through hole 35 formed on the door main body 30 moves between a position shown in FIG. 2 and a position shown in FIG. 3 by opening or closing the door main body 30. To be specific, strictly speaking, the through hole 35 draws an arc-shaped movement trajectory about the rotation axis of the door main body 30. However, as in the present embodiment, in a case where the through hole 35 is located close to the hanging side (in the vicinity of the rotation axis of the door main body 30), and the maximum rotation angle of the door main body 30 is 90°, a movement distance of the through hole 35 is short, and the movement trajectory is almost linear. The same is true for a case where the maximum rotation angle of the door main body 30 is not 90° but not more than 100°.

A frame opening portion 16 which extends in a predetermined direction so as to correspond to the movement trajectory of the through hole 35 is formed on a surface (upper door frame portion 11) of the door frame portion 10 which is opposed to the through hole 35. As above, since the movement trajectory of the through hole 35 is almost linear, the frame opening portion 16 is formed linearly. The frame opening portion 16 extends in an opening direction of the door main body 30 so as to be perpendicular to the closed door main body 30. Further, as shown in FIG. 3, a guide groove 17 having a concave cross section is formed on an outer peripheral surface (surface defining the frame opening portion 16) of the frame opening portion 16. A below-described slide supporting member 18 is fitted in the guide groove 17 so as to be slidable relative to the frame opening portion 16. An accommodating portion 24 which accommodates the slide supporting member 18 when the door main body 30 is opened is provided inside the upper door frame portion 11.

In FIG. 2, the frame opening portion 16 is formed in an oval shape. However, the shape of the frame opening portion 16 is not limited to this and may be the other shape, such as a square shape. Further, the frame opening portion 16 is only required to be formed so as to correspond to the movement trajectory of the through hole 35 and does not have to be perpendicular to the closed door main body 30. The frame opening portion 16 does not have to be formed linearly. For example, in a case where the through hole 35 is far from the hanging side of the door main body 30, the frame opening portion 16 may be formed obliquely relative to the closed door main body 30 so as to correspond to a line connecting the position of the through hole 35 when the door main body 30 is closed and the position of the through hole 35 when the door main body 30 is opened.

The slide supporting member 18 is a member which supports the cable 90 extending through the frame opening portion 16 while sliding relative to the frame opening portion 16 in accordance with the opening or closing of the door main body 30. The slide supporting member 18 slides in a direction in which the frame opening portion 16 extends, that is, in a direction corresponding to the movement trajectory of the through hole 35. The slide supporting member 18 is mainly constituted by a supporting portion 19 and a covering portion 20. The supporting portion 19 is a portion supporting the cable 90 and is provided with a supporting hole 21 whose diameter is larger than the diameter of the cable 90. The supporting portion 19 supports the cable 90 in a state where the cable 90 extends through the supporting hole 21.

The covering portion 20 is a portion adjacent to the supporting portion 19 and covering the frame opening portion 16. In the present embodiment, the covering portion 20 is located at the car inner side of the supporting portion 19. When the door main body 30 is closed, the covering portion 20 covers a car inner side portion of the frame opening portion 16. When the door main body 30 is opened, the covering portion 20 is accommodated in the accommodating portion. In the present embodiment, the covering portion 20 is not provided at the car outer side of the supporting portion 19 as shown in FIG. 3. Therefore, when the door main body 30 is opened, a car outer side portion of the frame opening portion 16 is opened. The reason why the covering portion 20 is not provided at the car outer side of the supporting portion 19 as above is because if the covering portion 20 is also provided at the car outer side of the supporting portion 19, and when closing the door main body 30, the covering portion 20 contacts the plate-shaped member 15, and this prevents the slide supporting member 18 from sliding. If there is no such circumstance unlike the present embodiment, the covering portion 20 may be provided at the car outer side of the supporting portion 19.

As can be understood from the above explanations, when the door main body 30 is in a closed state (FIG. 2), the slide supporting member 18 covers the frame opening portion 16 and supports the cable 90 which comes out from the upper end surface 34 of the door main body 30. As the door main body 30 opens, the slide supporting member 18 slides in a direction (direction indicated by an arrow) toward the car inner side and supports the cable 90 so as to prevent the cable 90 from rubbing against the frame opening portion 16. As above, according to the hinged door 100 of the present embodiment, the cable 90 extends through the through hole 35 of the upper end surface 34 of the door main body 30 to an inside of the door main body 30. Therefore, the length of the cable 90 exposed from between the door main body and the door frame portion can be reduced. In addition, a special member such as an intermediate member does not have to be provided between the upper end surface 34 of the door main body 30 and the upper door frame portion 11.

Strictly speaking, the supporting portion 19 slides linearly whereas the through hole 35 (cable 90) moves in an arch shape. However, since the diameter of the supporting hole 19 is larger than the diameter of the cable 90, the supporting portion 19 can keep supporting the cable 90. To easily deal with the difference between the movement trajectories of the supporting portion 19 and the cable 90, the entire slide supporting member 18 or at least the supporting portion 19 may be made of an elastic material such as rubber. Further, the through hole 35 and the supporting hole 21 may be coupled to each other by a flexible pipe formed by a metal spring-shaped member, or the cable 90 itself may be covered with this flexible pipe. The slide supporting member 18 is provided so as to slide inside the ceiling plate (upper door frame portion 11). However, how to provide the slide supporting member 18 is not limited to this. For example, a pair of projecting members each including the guide groove 17 may be respectively provided at both short-length direction sides of the frame opening portion 16, and the slide supporting member 18 may be provided so as to slide along the projecting members.

Embodiment 2

Figure 4:
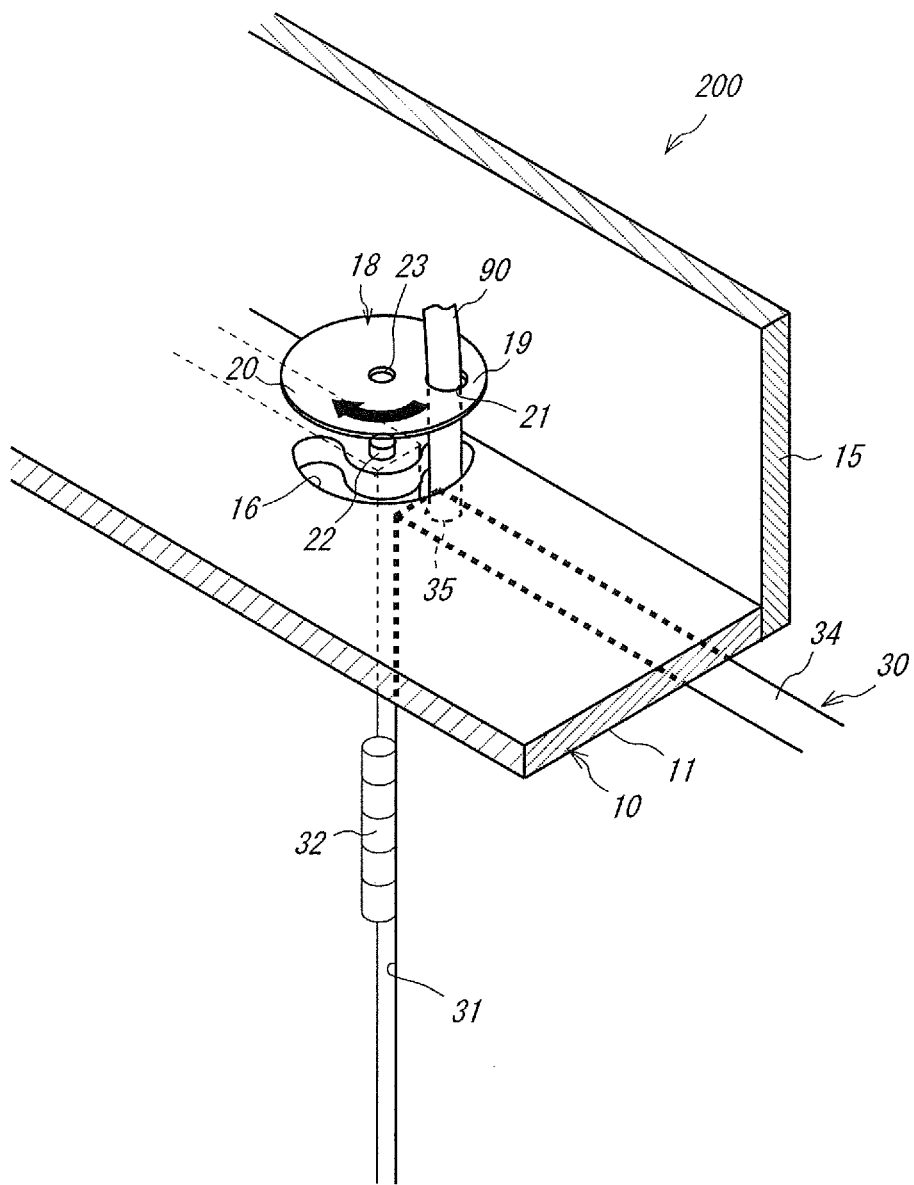
FIG. 4 is an enlarged perspective view of the upper left portion of the hinged door according to Embodiment 2 and is a diagram showing a state where the door main body is closed.

Next, a hinged door 200 according to Embodiment 2 will be explained in reference to FIG. 4. FIG. 4 is an enlarged perspective view of an upper left portion of the hinged door 200 and is a diagram showing a state where the door main body 30 is closed. Embodiment 2 is an embodiment in which the maximum rotation angle of the door main body 30 is 180°. To be specific, the door main body 30 opens from the state of FIG. 4 toward the car inner side that is the near side of the sheet of FIG. 4 and rotates until the door main body 30 becomes parallel to the wall of the end surface of the car. In accordance with the rotation of the door main body 30, the through hole 35 draws the arc-shaped movement trajectory.

As with Embodiment 1, the door frame portion 10 is provided with the frame opening portion 16 and the slide supporting member 18. However, the shapes and the like of the frame opening portion 16 and the slide supporting member 18 are different from those of Embodiment 1. FIG. 4 shows that the frame opening portion 16 and the slide supporting member 18 are separated from each other. However, the slide supporting member 18 is actually placed on the frame opening portion 16 so as to cover the frame opening portion 16 (to slidingly contact an upper surface of the ceiling plate). The frame opening portion 16 corresponds to the movement trajectory of the through hole 35 and is formed in an arc shape about the rotation axis of the door main body 30 (i.e., the rotation axis of the hinges 32). A rotation axis member 22 projecting upward is provided at the ceiling space side of the door frame portion 10 (on the upper surface of the ceiling plate) so as to be located on the rotation axis of the door main body 30.

The slide supporting member 18 has a circular plate shape, and a rotation axis hole 23 is formed at the center of the slide supporting member 18. The rotation axis member 22 is inserted into the rotation axis hole 23. With this, the slide supporting member 18 can rotate about the rotation axis member 22, that is, the rotation axis of the door main body 30. The slide supporting member 18 is mainly constituted by the supporting portion 19 and the covering portions 20. The supporting portion 19 is provided with the supporting hole 21 whose diameter is larger than the diameter of the cable 90. The covering portions 20 are respectively located at both sides of the supporting portion 19 in the circumferential direction (at the entire periphery of the slide supporting member 18 except for the supporting portion 19).

According to the present embodiment, when the door main body 30 is in a closed state (FIG. 4), the covering portion 20 located at a clockwise direction side of the supporting portion 19 covers the frame opening portion 16. As the door main body 30 opens, the slide supporting member 18 rotates in a clockwise direction (slides in a direction indicated by an arrow), and the covering portions 20 located at the clockwise direction side and counterclockwise direction side of the supporting portion 19 cover the entire frame opening portion 16. This state where the entire frame opening portion 16 is covered is maintained until the rotation angle of the door main body 30 reaches 180°. As above, even in a case where the door main body 30 rotates until the rotation angle becomes 180°, the slide supporting member 18 can support the cable 90 so as to prevent the cable 90 from rubbing against the frame opening portion 16 and can cover the entire frame opening portion 16 regardless of a rotation angle position of the slide supporting member 18.

The hinged door according to Embodiment 1 or 2 described above includes: a door frame portion; a door main body arranged inside the door frame portion; and an attaching member by which the door main body is rotatably attached to the door frame portion, wherein: a cable extends between the door frame portion and the door main body; the door main body includes a through hole formed on an end surface located at an end of the door main body in a rotation axis direction of rotation of the door main body, the cable being inserted through the through hole; and the door frame portion includes a frame opening portion which is formed on a surface opposed to the through hole and has a shape corresponding to a movement trajectory of the through hole when the door main body is opened or closed and a slide supporting member supporting the cable extending through the frame opening portion while sliding relative to the frame opening portion.

According to this configuration of the hinged door, since the cable extends between the end surface of the door main body which is located at the end of the door main body in the rotation axis direction and the door frame, a special member such as an intermediate member provided between the door main body and the door frame portion is not required, and the length of the cable exposed from between the door main body and the door frame portion can be reduced. With this, damages to the cable by humans when the door main body is opened can be suppressed. Since the intermediate member is not required, properties, such as a waterproof property, airtightness, a heat insulation property, and a soundproof property, of the hinged door can be improved. Since the cable extends between the door main body and the door frame without extending through the inside of the intermediate member, the thickness of the cable is not influenced by the intermediate member, so that the thickness of the cable extending between the door main body and the door frame can be made larger than that of the cable of the conventional hinged door.

Further, in the above-described embodiment, the slide supporting member includes a supporting portion supporting the cable and a covering portion adjacent to the supporting portion and extending in a direction in which the slide supporting member slides, and the covering portion covers at least a part of the frame opening portion. Therefore, a part of a human body, such as a finger, is prevented from getting into the frame opening portion and therefore being injured, and foreign matters can be prevented from intruding through the frame opening portion into the devices in the ceiling space.

The hinged door according to Embodiment 1 can be configured such that: a maximum rotation angle of the door main body is not more than 100°; the through hole is located at a hanging side of the door main body; and the slide supporting member slides linearly. According to this configuration, the slide supporting member is only required to be able to slide linearly. Therefore, the structure of the door frame portion can be made simpler than a case where the slide supporting member slides in a curved manner.

The hinged door according to the above-described embodiment is provided at an end surface of a railcar, and the door main body opens toward a car inner side. In a case where the hinged door is provided at vehicles (such as railcars) and buildings available to the public, the cable incorporated in the hinged door is required to be hardly exposed to the outside. The hinged door according to the above-described embodiment can satisfy this requirement. The hinged door according to Embodiment 1 or 2 may be provided between a driver's cab and passenger room of the railcar or may be provided at a structure other than the railcar.

In the hinged door according to the above-described embodiment, each of the door main body and the door frame portion is formed in a square shape. However, in the hinged door according to Embodiment 1 or 2, the shape of each of the door main body and the door frame portion is not limited to the square shape. Further, the above-described embodiment has explained a case where the cable comes out from the upper surface of the door main body. However, the cable may come out from not the upper surface but the lower surface of the door main body, and the frame opening portion and the like may be formed on the lower door frame portion. In the above-described embodiment, the rotation axis direction of the door main body corresponds to the upper-lower direction. However, the rotation axis direction of the door main body may correspond to a left-right direction. In this case, the through hole is formed on an end surface of the door main body which located at an end of the door main body in the left-right direction, and the frame opening portion is formed on a surface of the door frame portion which is opposed to the through hole.

The foregoing has explained the hinged door configured such that the cable extends between the door frame portion and the door main body. However, this configuration of the hinged door is also applicable to a hinged door configured such that a hose for compressed air or operating oil extends between the door frame portion and the door main body. To be specific, in the above embodiment, the hinged door may include the hose instead of the cable.

The foregoing has explained the hinge as the attaching member by which the door main body is rotatably attached to the door frame portion. However, a member other than the hinge may be used as the attaching member. For example, the attaching member may be constituted by: rotation axis members respectively projecting from the upper end surface and lower end surface of the door main body in the upper-lower direction; and bearing portions provided at the door frame portion to respectively receive the rotation axis members. Further, for example, the attaching member may be a support arm which is driven by an actuator while supporting the door main body and rotates the door main body relative to the door frame portion.

The foregoing has explained the embodiments in reference to the drawings. However, specific configurations are not limited to these embodiments. Design changes and the like within the scope of the present invention are included in the present invention.

INDUSTRIAL APPLICABILITY

The present invention is useful for a hinged door including a cable or hose provided to extend between a door main body and a door frame portion.

REFERENCE SIGNS LIST 10 door frame portion
16 frame opening portion
19 slide supporting member
18 supporting portion
20 covering portion
30 door main body
34 upper end surface (end surface located at an end in a rotation axis direction)
35 through hole
90 cable
100, 200 hinged door

The invention claimed is:
1. A hinged door comprising:
a door frame portion;
a door main body arranged inside the door frame portion; and
an attaching member by which the door main body is rotatably attached to the door frame portion, wherein:
a cable or a hose extends between the door frame portion and the door main body;

the door main body includes a first through hole formed on an end surface located at an end of the door main body in a rotation axis direction of rotation of the door main body, the cable or the hose being inserted through the first through hole; and the door frame portion includes
- a second through hole which is formed on a surface of the door frame portion, the surface being located opposed to the first through hole, the second through hole having a shape corresponding to a movement trajectory of the first through hole when the door main body is opened or closed, and
- a slide supporting member supporting the cable or the hose extending through the second through hole while sliding relative to the second through hole.

2. The hinged door according to claim 1, wherein:

the slide supporting member includes a supporting portion supporting the cable or the hose and a covering portion adjacent to the supporting portion and extending in a direction in which the slide supporting member slides; and the covering portion covers at least a part of the second through hole.

3. The hinged door according to claim 2, wherein:

a maximum rotation angle of the door main body is not more than 100°;

the first through hole is located at a hanging side of the door main body; and the slide supporting member slides linearly.

4. The hinged door according to claim 3, wherein:

the hinged door is provided at an end surface of a railcar; and the door main body opens toward a car inner side.

5. The hinged door according to claim 1, wherein each of the door main body and the door frame portion is formed in a quadrangular shape.

* * * * *